United States Patent [19]

Hooper

[11] Patent Number: 5,577,593
[45] Date of Patent: Nov. 26, 1996

[54] CARRIER CONVEYOR SYSTEM

[75] Inventor: Richard G. Hooper, Southfield, Mich.

[73] Assignee: FKI Industries, Inc., Fairfield, Conn.

[21] Appl. No.: 379,370

[22] Filed: Jan. 27, 1995

[51] Int. Cl.$^6$ ..................................................... B61B 9/00
[52] U.S. Cl. .................. 198/346.1; 198/369.2; 104/88.02; 104/165
[58] Field of Search ..................... 104/88.02, 105, 104/172.1; 198/346.1, 369.2, 578

[56] References Cited

U.S. PATENT DOCUMENTS

| | | | |
|---|---|---|---|
| 2,816,643 | 12/1957 | Klamp | 198/465.4 |
| 2,938,626 | 5/1960 | Dahms | 209/549 |
| 3,559,793 | 2/1971 | Lange | 198/346.1 |
| 3,672,486 | 6/1972 | Kennedy | 198/791 |
| 3,871,303 | 3/1975 | Woodling | 104/173.1 |
| 3,874,302 | 4/1975 | Crosswhite | 104/172.3 |
| 3,929,079 | 12/1975 | Eliassen | 104/172.3 |
| 4,039,075 | 8/1977 | Gray | 198/746 |
| 4,174,777 | 11/1979 | Riehle | 198/781.06 |
| 4,564,100 | 1/1986 | Moon | 198/341 |
| 4,659,281 | 4/1987 | Aupperle | 414/787 |
| 4,696,236 | 9/1987 | Kanayama | 104/165 |
| 4,718,349 | 1/1988 | Wahren | 104/165 |
| 4,747,193 | 5/1988 | Hashidate | 29/33 P |
| 4,753,275 | 6/1988 | Schaltegger | 141/1 |
| 4,871,057 | 10/1989 | Aarts | 198/346.1 |
| 4,976,025 | 12/1990 | Aldridge | 29/563 |
| 4,991,706 | 2/1991 | Kitamura | 198/346.1 |
| 5,018,617 | 5/1991 | Miyata | 198/346.1 |
| 5,099,981 | 3/1992 | Guzzoni | 198/346.1 |
| 5,103,959 | 4/1992 | Carlson | 198/345.1 |
| 5,145,048 | 9/1992 | Kitamura | 198/346.1 |
| 5,145,052 | 9/1992 | Santandrea | 198/468.2 |
| 5,147,176 | 9/1992 | Stolzer | 414/786 |
| 5,156,254 | 10/1992 | Kitamura | 198/346.1 |
| 5,160,011 | 11/1992 | Yoshiji | 198/345.3 |
| 5,176,241 | 1/1993 | Schaltegger | 198/346.2 |
| 5,178,255 | 1/1993 | Carlson | 198/346.1 |
| 5,205,026 | 4/1993 | Sticht | 29/33 P |
| 5,237,736 | 8/1993 | Inoue | 29/563 |
| 5,257,689 | 11/1993 | Lombardi | 198/486.2 |
| 5,271,139 | 12/1993 | Sticht | 29/430 |
| 5,271,490 | 12/1993 | Sticht | 198/349 |
| 5,301,788 | 4/1994 | Hironaka | 198/346.1 |
| 5,303,809 | 4/1994 | Zeller | 198/341 |
| 5,321,874 | 6/1994 | Mills | 29/33 P |
| 5,330,043 | 7/1994 | Stuckey | 198/346.2 |
| 5,346,051 | 9/1994 | Keith | 198/346.1 |
| 5,360,098 | 11/1994 | Nishikawa | 198/346.1 |

*Primary Examiner*—S. Joseph Morano
*Attorney, Agent, or Firm*—Barnes, Kisselle, Raisch, Choate, Whittemore & Hulbert, P.C.

[57] ABSTRACT

A carrier conveyor system wherein carriers are disengaged from a main conveyor in advance of a work station and re-engaged beyond the work station. A transfer conveyor is positioned such that it receives the carriers as they are disengaged from the main conveyor, transfers them as required to the work station, removes them from the work station after the work is performed, and returns them to the main conveyor. The transfer conveyor comprises a plurality of transfer assemblies arranged in succession along the carrier travel path, and each include right and left hand mirror-imaged belt modules that are mechanically drivingly cross-connected to each other.

29 Claims, 12 Drawing Sheets

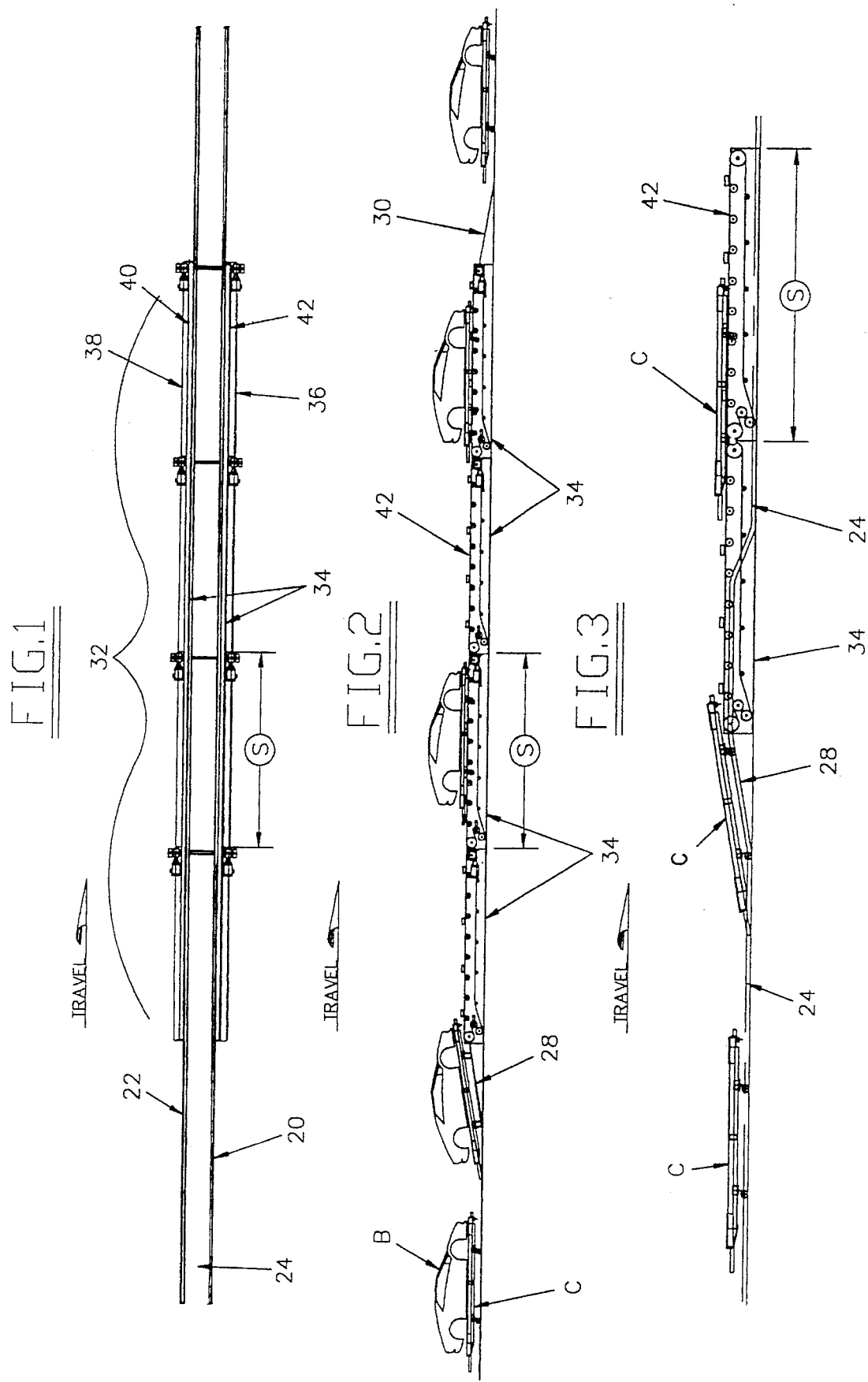

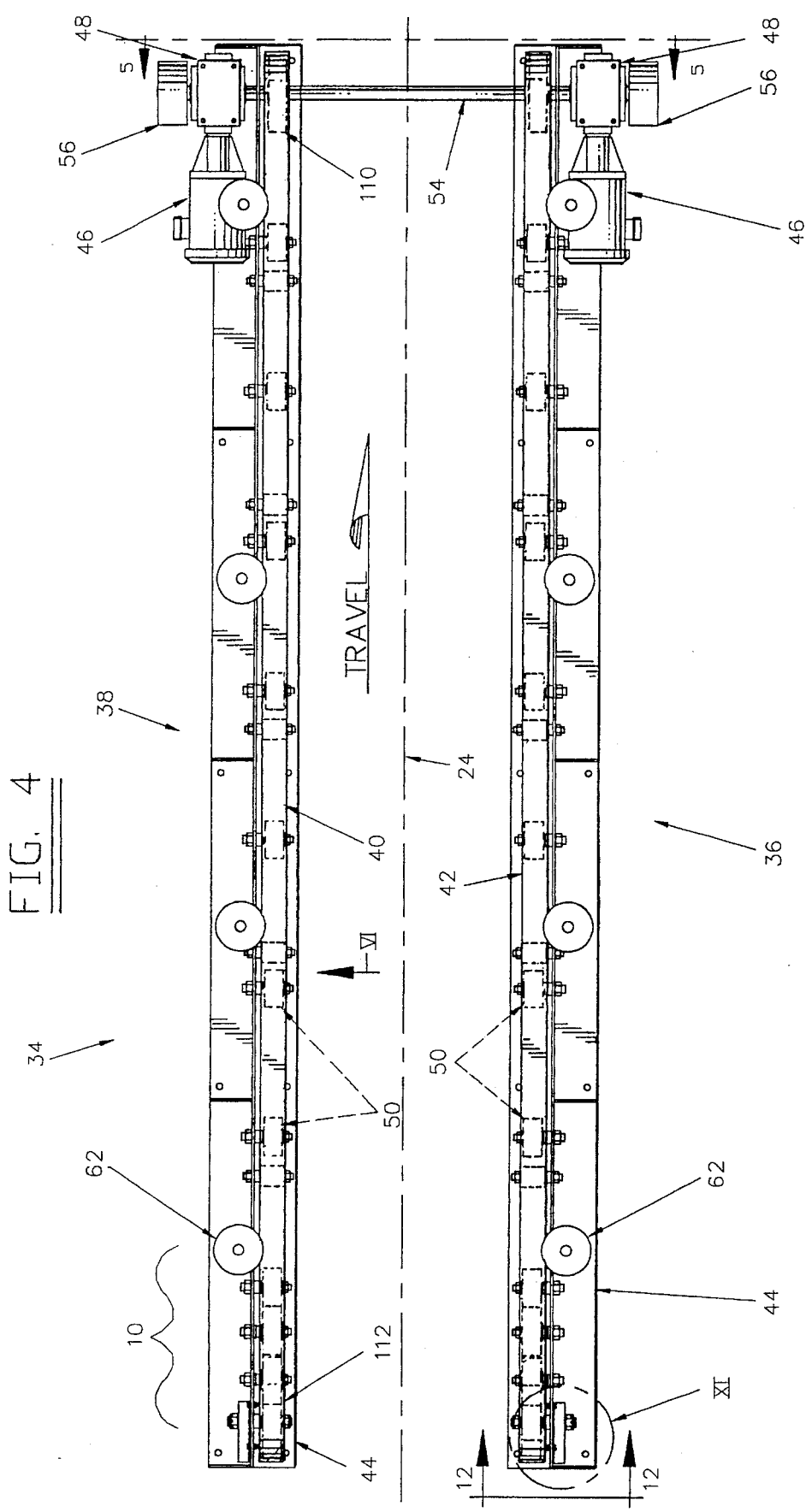

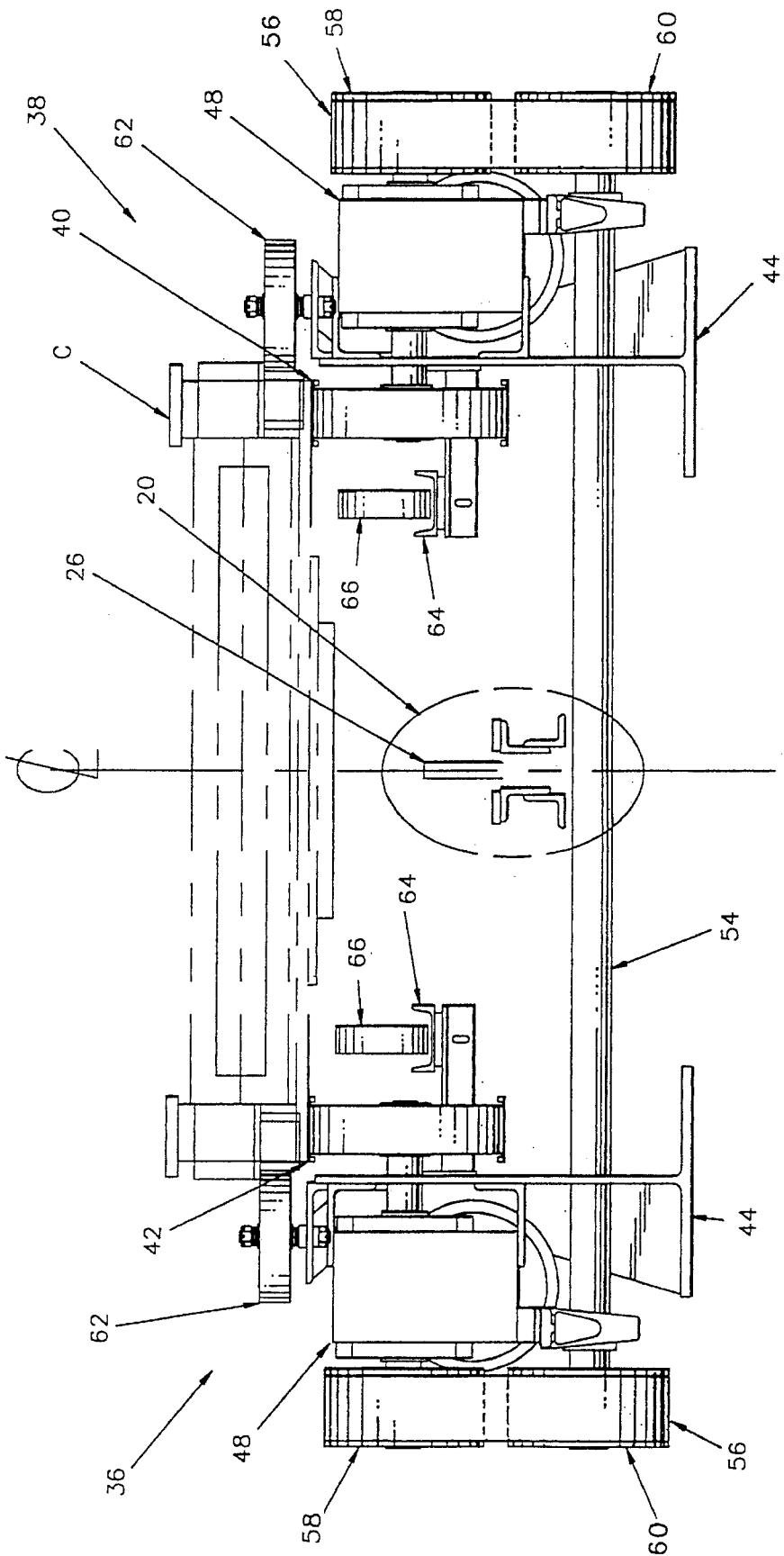

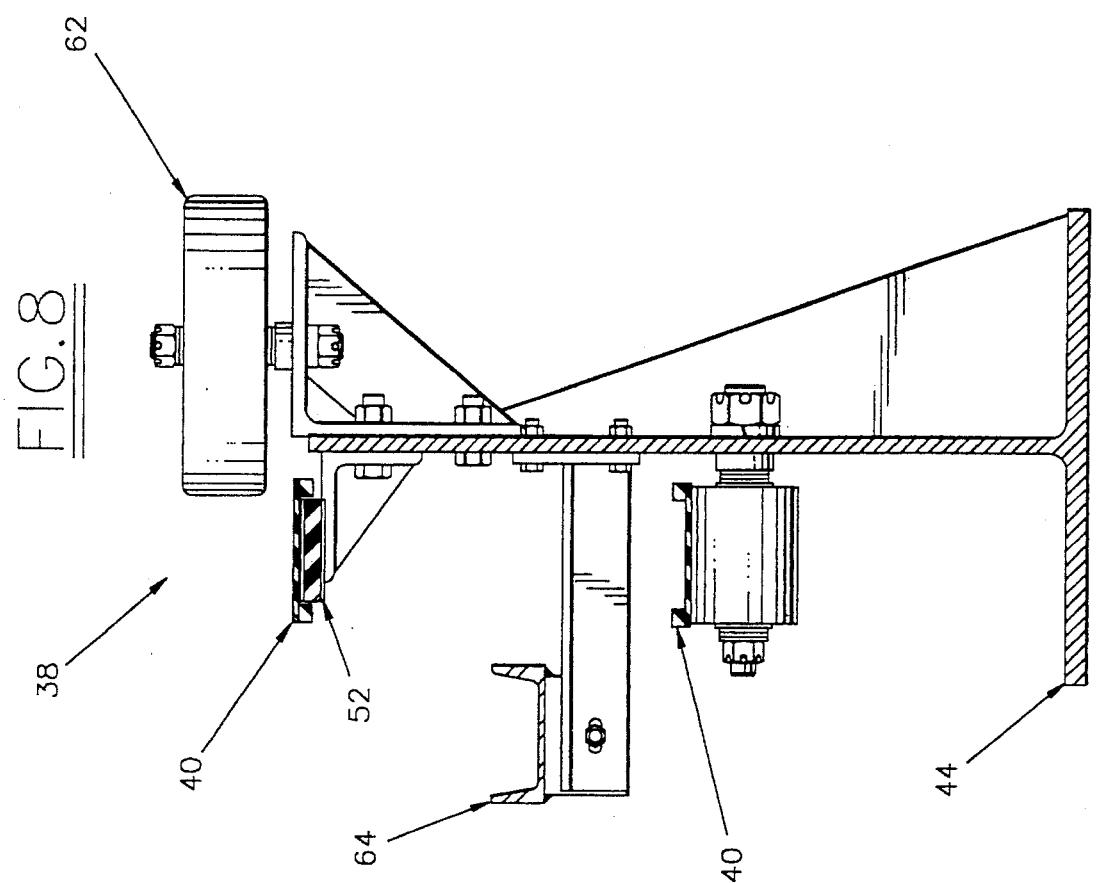
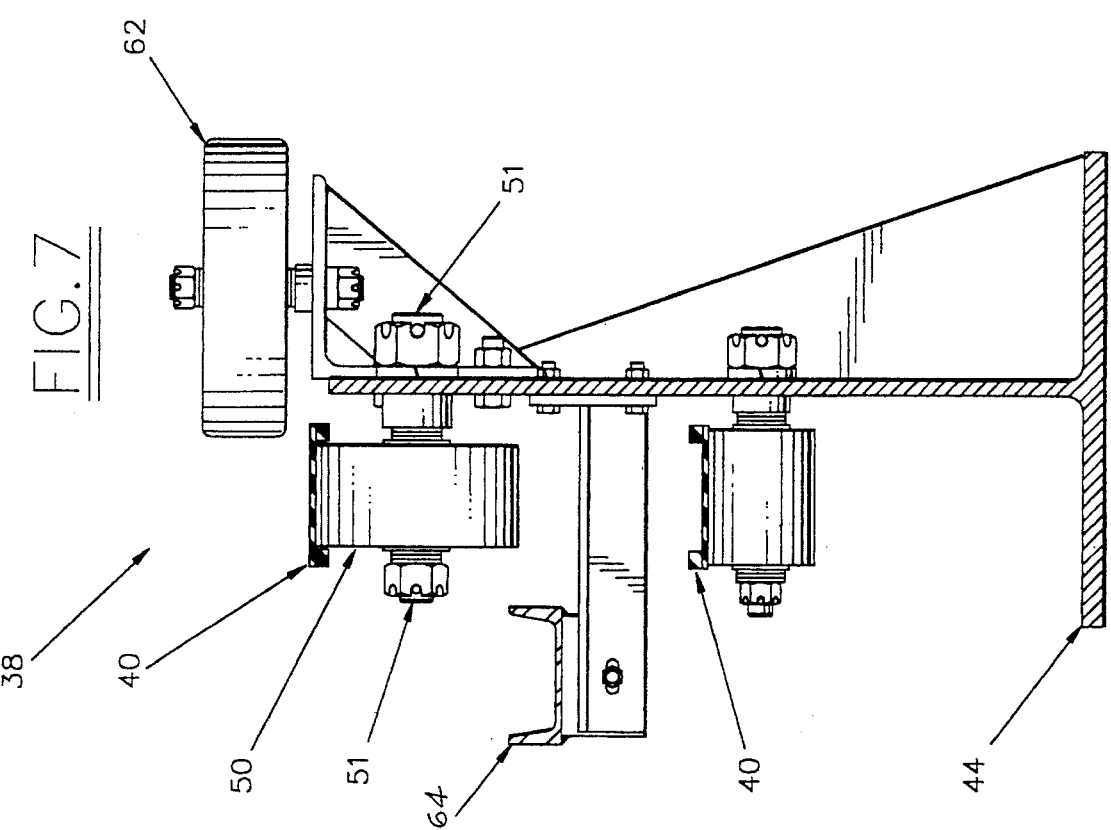

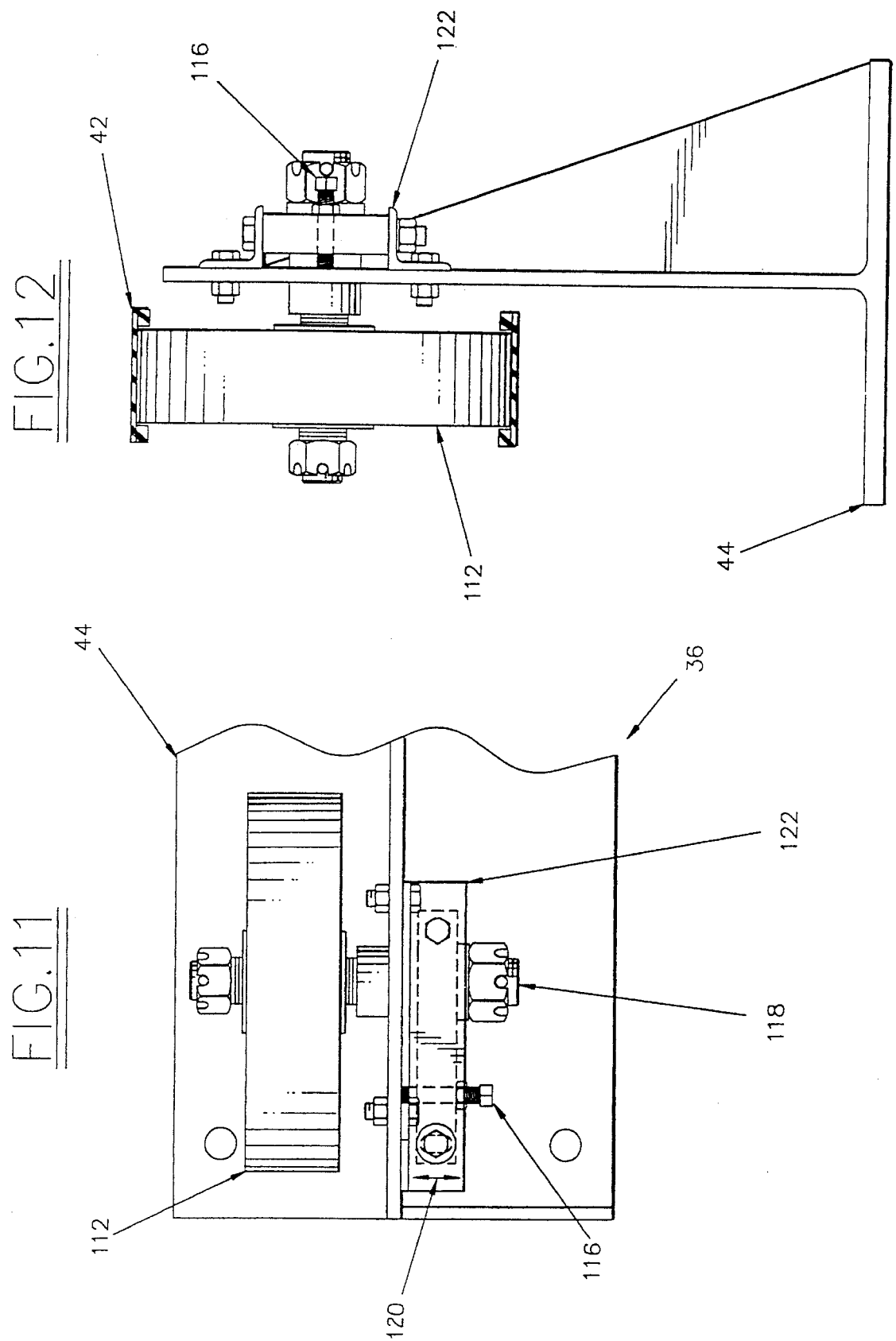

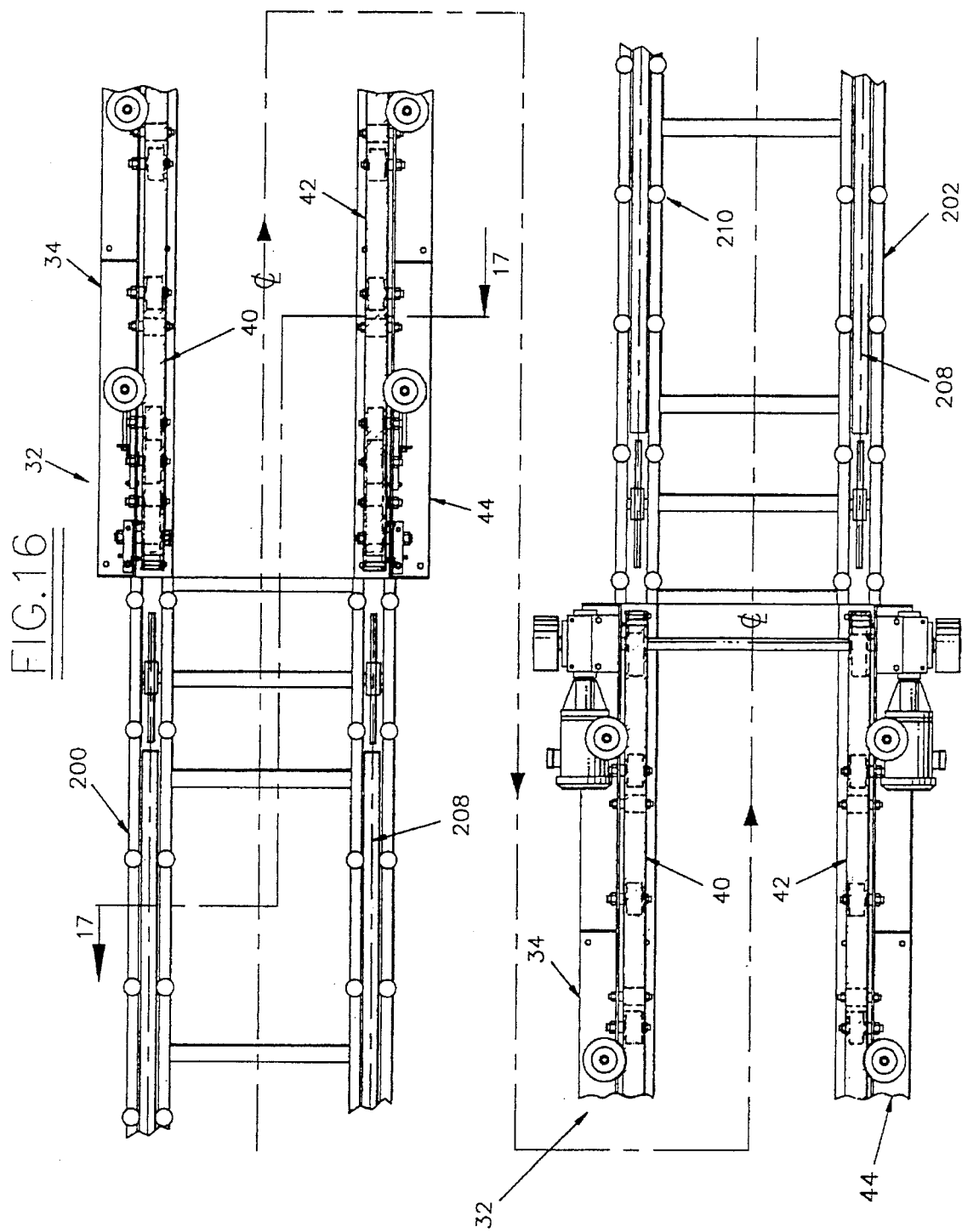

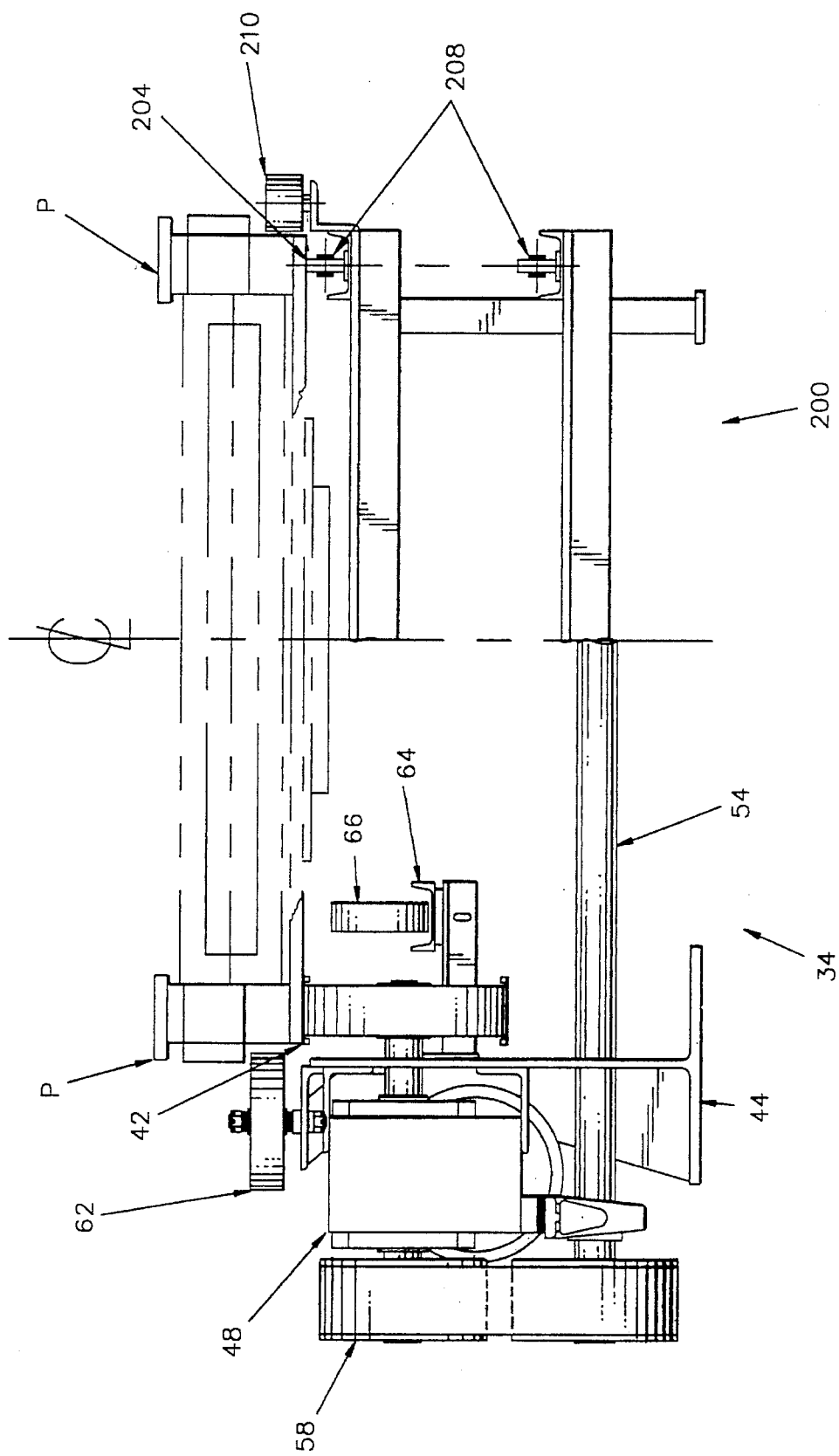

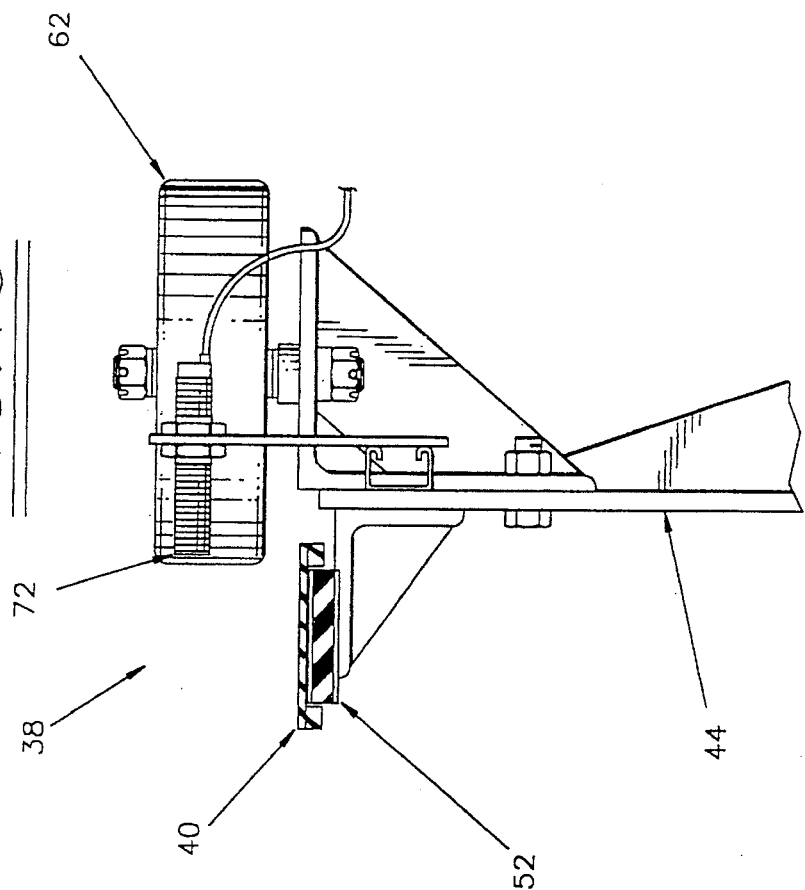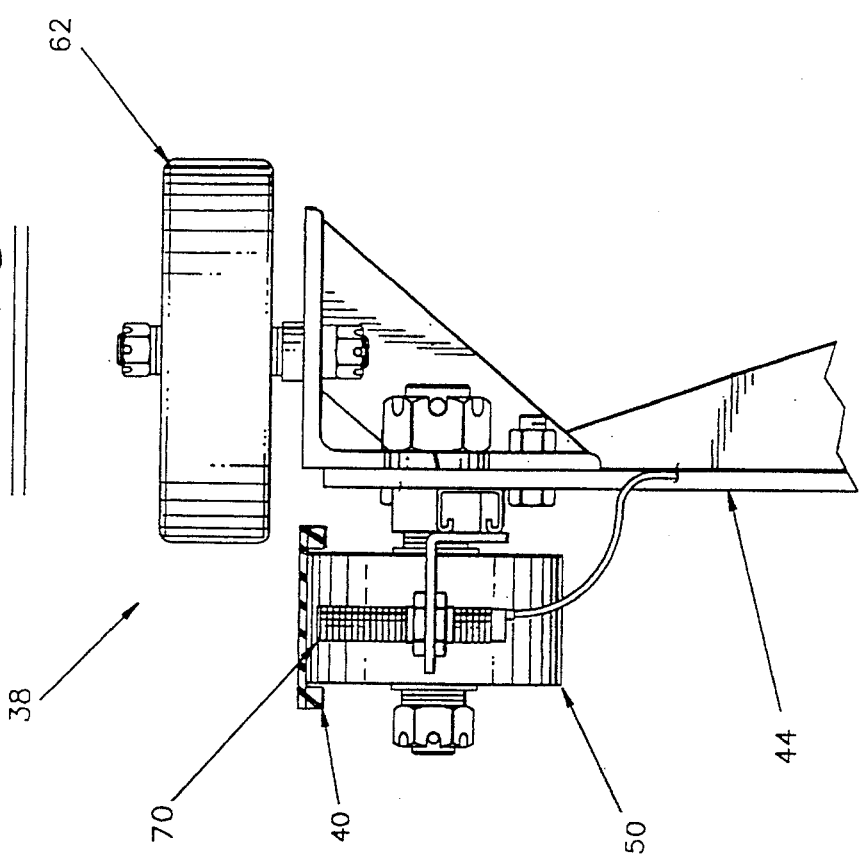

CARRIER CONVEYOR SYSTEM

This invention relates to carrier conveyor systems and particularly to conveyor systems wherein a plurality of carriers are normally moved continuously in a predetermined path along which workers perform various tasks on the work transported by the carriers.

BACKGROUND OF THE INVENTION

A common and well known type of carrier conveyor system comprises a plurality of work carriers, such as wheeled carriers or skids, which are moved along a predetermined path by a main conveyor underlying and engaging the carriers. As the carriers are moved along, workers commonly perform various tasks on the work carried by the carriers. Thus, for example, workers may apply or work upon portions of an automobile body supported by the carriers. In order to obtain optimum efficiency, the carriers are placed in close longitudinally spaced relation to one another. In such systems, the carrier can be disengaged from the main conveyor as required.

With the advent of automated machines such as robots, it is desirable to be able to perform some tasks on the work with such machines. However, such machines may require interruption of the flow of the work carrier for a predetermined period of time and thus the work carrier must be disengaged from the main conveyor. After the task is performed by the machine, the carrier is re-engaged with the main conveyor. Once again to insure optimum efficiency, the carrier must be disengaged with the main conveyor and re-engaged with the main conveyor quickly without the loss of the original job spacing and sequence on the main conveyor.

Automated work stations can be inserted into manned assembly conveyors either by making the automation mobile to perform tasks "on the fly", or by providing closer job spacing with sufficient accumulation before and after a fixed automated work station. The second method is often preferable because of much lower cost and higher reliability of robotic equipment operating on stationary work.

However, an excessively long distance would be required to provide work time on a slow moving close job spaced conveyor, as is common in the automotive industry. It is therefore, desirable to provide some intervening means of speeding the flow of product (jobs) without disrupting the normal operation of the conveyor. Such a conveyor device would reduce the space and time required to a practical minimum.

Many methods of high speed castered truck transfer have been devised; however, they all have one or more of the following deficiencies:

The trucks are moved on their own casters at high speed, causing fast deterioration.

High noise level.

A high truck modification cost.

Reciprocating devices which cause lost time and additional motion and wear.

An assortment of auxiliary equipment and numerous controls are required.

Floor pits or a significant conveyor elevation changes are required. The latter usually results in long ramps resulting in wasted plant space.

Higher speeds are hindered by the physical limitations of the mechanisms employed.

Relatively high maintenance requirements.

As an example, mechanisms have been heretofore proposed for such transfer of the carriers to and from the work station including mechanical and hydraulic devices for grasping the carrier, transferring it to the work station and returning it to the main conveyor. Such devices have been complex and costly to build and maintain.

Accordingly, among the objectives of the present invention are to provide a conveyor system which will remove a work carrier from engagement with the main conveyor, transfer it to the work station, and return it from the work station to the conveyor in the shortest possible distance while making it possible to maintain a proper supply of carriers in advance of and beyond the work station to insure that the remainder of the system has a carrier at each job space of the main conveyor; which has a low profile; which is accessible for service; which provides ready access to the work station; which is in the normal path of the conveyor; which is low in cost; which is modular and can be adapted to various systems; which provides a degree of redundancy to permit operation even if a portion of the system malfunctions; which functions without substantial lifting of the carrier; which requires minimal change in the construction of the main conveyor; which requires minimal change, if any to the work carrier; and/or which can be retrofitted to conventional carrier systems.

One commercially successful prior conveyor system which also achieves the foregoing objects is that set forth in U.S. Pat. No. 4,564,100 issued Jan. 14, 1986 in the name of Edward E. Moon and assigned to the assignee of record herein. The present invention provides an improvement in the system, method and apparatus of the Moon '100 patent while achieving the aforementioned objects and retaining the advantages of the '100 patent system, as well as achieving further objects and providing additional advantages thereover as set forth hereinafter.

OBJECTS OF THE INVENTION

Accordingly, a further object of the present invention is to provide an improved carrier conveyor system capable of achieving the objects and providing the advantages of the aforementioned Moon '100 patent system and apparatus but at lower cost to manufacture and operate, requiring less maintenance and replacement parts, capable of higher rates of acceleration and deceleration of carriers transported in the system, providing additional fail safe operational features, capable of handling a greater variety of carrier configurations, which is quieter in operation and which is easier to adjust both during operation and during service down time, and which eliminates or at least greatly minimizes carrier rework.

SUMMARY OF THE INVENTION

This invention thus directs itself to providing a solution to the requirements for an automated work station, while, like the '100 patent system, avoiding the aforementioned deficiencies of the other available methods. However, because of its low cost and versatility of arrangement, it has excellent utility for handling a variety of racks, skids or other products. It can be arranged in systems of varying size or used as a single section wherever only high speed transfer is required.

In accordance with the invention, means are provided for disengaging the carriers from the main conveyor in advance of the work station and re-engaging the carriers beyond the work station. A transfer conveyor is positioned such that it receives the carriers as they are disengaged, transfers them as required to the work station, removes them from the work station after the work is performed and returns them to the main conveyor. The transfer conveyor comprises a plurality modular transfer assemblies each comprising dual, mirror-image transfer modules positioned along each side of the path of the carriers. The transfer assemblies, each with their modules drivingly integrated in cooperative, laterally soaced pairs, are arranged to provide a synchronized transfer conveyor wherein a plurality of transfer assemblies are further operably integrated in tandem succession to transport carriers from the entrance area, where the carriers are disengaged from the main conveyor, through the work station and then to the exit area where the carriers are re-engaged with the main conveyor.

In accordance with one principal feature of the present invention, each transfer module consists of a narrow belt driven by a head pulley and supported by either idler wheels, a slider bed, or a combination of the two, configured to supportingly engage the associated left or right hand portion of the underside of the carriers. The belts of the dual modules of each transfer assembly are driven continuously when it is desired such that the carrier be moved by each transfer assembly to the succeeding transfer assembly or position. The number of transfer assemblies is such that there will be sufficient time at the work station to perform the function desired and at the same time there will always be a carrier ready for re-engagement with the conveyor, thereby insuring that there will be a carrier at each job space on the main conveyor in the remainder of the conveyor system.

BRIEF DESCRIPTION OF THE DRAWINGS

Other objects as well as features and advantages of the present invention will become apparent from the following detailed description, appended claims and accompanying drawings forming a part of this specification, which are to scale unless otherwise indicated, wherein:

FIG. 1 is a partly diagrammatic plan view of a typical conveyor system embodying the invention.

FIG. 2 is a partly diagrammatic elevational view of the system of FIG. 1 and further illustrating auto bodies individually loaded on work truck carriers for transport by the system.

FIG. 3 is a fragmentary elevational view of a portion of the system.

FIG. 4 is a full plan view of one complete transfer assembly of the system with right and left hand modules cross connected.

FIG. 5 is an enlarged transverse vertical sectional view taken on the line 5—5 of FIG. 4 of a complete transfer assembly at the head section including a body truck and the main conveyor.

FIG. 7 is an enlarged transverse vertical sectional taken on 7—7 of FIG. 6 at a belt idler wheel.

FIG. 8 is an enlarged transverse vertical sectional view taken on the line 8—8 of FIG. 6 at a belt slider bed.

FIG. 11 is an enlarged fragmentary plan view of the portion of FIG. 4 encircled at XI in FIG. 4 and enlarged thereover at the tail pulley.

FIG. 12 is an elevational view taken on the line 12—12 of FIG. 4 at the tail pulley.

FIG. 16 is a fragmentary plan split view of the system shown in FIG. 15.

FIG. 17 is a sectional view taken along the line 17—17 in FIG. 16.

FIG. 18 is a fragmentary sectional view, similar to FIG. 7, of a sensing system utilized on the conveyor with belt supported by casters.

FIG. 19 is a fragmentary sectional view, similar to FIG. 8, of a sensing system utilized on the conveyor system with belt supported by slider beds.

DETAILED DESCRIPTION OF PREFERRED EMBODIMENTS

Figure 6:
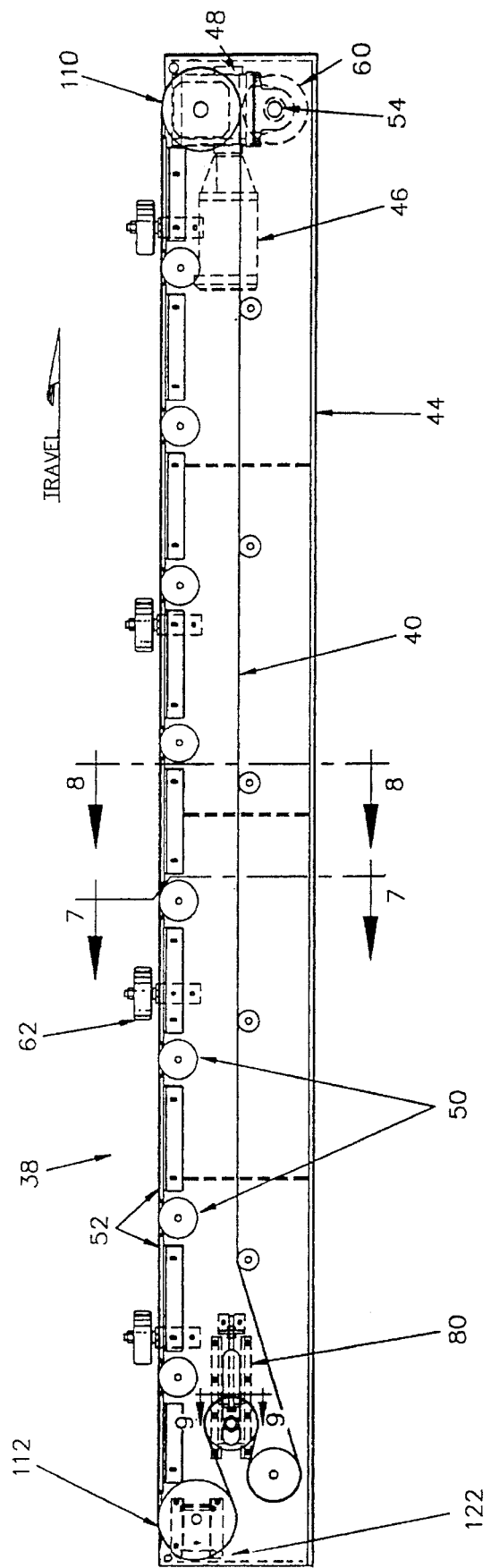
FIG. 6 is a complete elevational view of the interior side of a left hand transfer module of one transfer assembly as viewed in the direction of arrow VI of FIG. 4.

Referring to FIGS. 1, 2 and 3, the invention relates to a conveyor system which comprises a plurality of load carriers C which are adapted to be moved along a predetermined path for tasks to be performed on the articles supported by the carriers by workers as the carriers are moved along the path. In a typical arrangement, the carriers C comprise caster wheeled trucks individually carrying auto bodies B and that are guided by tracks 20 and 22 and driven by a main or process chain conveyor 24 having longitudinally spaced pushers 26 (FIG. 5) engaging the trucks C, a truck C being engaged with each pusher.

Where it is desired to perform a task with the carrier stopped at one or more work stations S, the carriers must be disengaged from the main conveyor, transferred forward to the work station S where the carrier C remains stationary for a predetermined period of time sufficient to perform a task, and then further transferred forward for return to the main conveyor 24. In order to insure that there will be a carrier C in the proper sequence at each job space or pusher position on the main conveyor 24 in the remaining part of the system, the present invention provides for rapid disengagement and transfer of a minimum number of carriers seriatum generally along the path of the main conveyor.

In accordance with the invention, provision is made for disengagement of the carriers C from the main conveyor 24 in advance of the work station S and re-engagement of the carriers with the main conveyor beyond the work station. Such disengagement occurs at a first inclined track or ramp 28 (FIGS. 2 and 3) on which the carriers C ride upwardly to the level of the transfer in advance of the work station. Such re-engagement occurs at a second declined (oppositely inclined) track or ramp 30 on which the carriers C ride downwardly to the level of the main conveyor 24 beyond the work station. If the main conveyor is at a sufficient elevation, the ramps may not be required.

Further, in accordance with the invention, a transfer conveyor 32 is positioned between the two ramps 28, 30 for successively moving the carriers rapidly. Transfer conveyor 32 comprises a plurality of transfer assemblies 34 positioned in tandem along the travel path of the carriers on conveyor 32. Each assembly 34 includes a pair of right and left handed (as viewed looking in the travel direction) modules 36 and 38 respectively, each respectively having a left and a right hand narrow continuous loop belts 40 and 42 supported by either idler wheels, a slider bed or a combination of the two. The paired belts are laterally spaced apart and have their upper runs configured to engage laterally opposite longitudinally extending surfaces of the underside of the carriers C. Belts 40 and 42 in each transfer assembly 34 are driven continuously when their drive is energized so that the transfer assembly 34 will move the carrier C longitudinally to the next downstream transfer assembly 34, or to exit ramp 30 in the case of the last downstream transfer assembly.

Referring to FIGS. 4, 5, 6, 7 and 8, each transfer assembly 34 comprises a pair of right and left hand oriented transfer modules 36 and 38 in laterally spaced relation, one being the mirror image of the other. Each module 36, 38 includes a longitudinally extending T-frame member 44, a variable speed AC or DC motor 46 mounted to T-member 44 and operably drivingly coupled to a reducer 48, which is also mounted on 44. A plurality of soft treaded idler wheels 50, and/or slider beds 52, are also mounted on T-frame member 44 and support the upper run of the associated belts 40, 42 which frictionally engage the underside of the carriers C to move the same on and along each transfer assembly 34.

The reducers 48, either one designated as the "main" and the other as a "back-up", are cross connected by means of an under hung jack shaft 54 driven by gear belts 56 trained on reducer and shaft pulleys 58 and 60. A row of resiliently compressible side guide rollers 62 are also mounted to the T-frame and have their rotational axes extending vertically and are oriented for rolling yieldable engagement with the sides of the carriers to guide the carriers laterally centered as they move along each transfer assembly 34 (FIGS. 4–8). In this fashion, the opposed transfer modules 36 and 38 of each transfer assembly function to move the carriers C longitudinally along the path of the main conveyor. Stationary channel guides 64 are mounted off the interior sides of T-frames 44 for close clearance with the travel path of carrier-suspended swivel caster wheels 66 (FIG. 5) to thereby prevent swiveling thereof into the idler wheels 50 supporting belts 40, 42. Guides 64 also maintain the orientation of swivel caster wheels 66 while the carrier is still in the transfer conveyor 32 suspended above and out of engagement with main conveyor 20.

Sensing means are provided along the path of the carriers C in each transfer assembly 34 to control the operation of the associated drive. As shown by their respective mounted orientation in FIGS. 18 and 19, this comprises conventional solid state inductive proximity sensors 70 and 72 which emit a small radio frequency field. When a metallic target, e.g., frame of carrier truck C, workpiece B thereon and/or carrier affixed target plates, enters the emitted field, the resultant eddy current losses trigger the sensor control switch. The sensors 70 and 72 are operable electrically coupled through a suitable conventional program controller (not shown) to associated motors 46 such that they function to control the speed and positioning of each carrier C.

As best seen in FIGS. 1, 4 and 5, the exterior area alongside the transfer assemblies 34 is free and unobstructed, and the transfer assemblies have a low profile, thereby allowing a clear area for working at a convenient height and for operation of various devices required at the work station S.

Thus, as an example, it is possible to insert a relatively fixed automated work station into an assembly or main conveyor which uses carriers C, such as four wheeled caster trucks, to carry the work or product. These trucks C are towed by dogs 26 on a main conveyor 20 movable along the floor. The trucks C are movable along the conveyor line through sequential job spaces somewhat longer than the trucks C themselves. The system functions to detach trucks C seriatum from main conveyor 20 without disturbing its normal operation, support each truck C so that it can be transferred at high speed through one or more feed-in stations toward the work station S, stop the truck C at work station S, and then further advance the truck C through one or more additional feed-out stations, again at high speed, to return it to main conveyor 20 immediately behind the previous one so that there are no carrier-vacant job spaces along the main conveyor line, meanwhile providing the necessary stationary work and safety time at the robotic work station S.

The invention provides all of these requirements while using a plurality of common modularized units of conveyor transfer assemblies 34 at each station. From the foregoing it will be seen that each unit has the following features:

A drive unit 46, 48, 56 on each side which together operate as an alternately selectable main and back-up drive. To activate the backup drive, one only needs to switch the electrical power.

An AC or DC variable speed drive motor 46 and associated programmable controller operable for synchronous transfer, positioning, and controlled acceleration and deceleration of carriers C on transfer conveyor 32, and capable of speeds from 0 to 360 feet per minute therealong.

A pair of laterally spaced narrow belts 36 and 38, supported by either soft treaded idler rolls 50, a slider bed or beds 52, or an alternating combination of the two aligned in a row, which does not require the bottom of the carrier to be planar. Other systems require a very flat bottom skid in order to maintain full surface contact with spaced support and drive rollers or wheels to work effectively, otherwise slipping and/or part vibration and/or damage will occur, whereas belts 40 and 42 do not require the skid to have a continuous bottom. Additionally, if belts 40, 42 are supported exclusively by rolls 50, each transfer assembly can run temporarily with one of the belts 40, 42 missing so as not to interrupt scheduled production. Belts 40 and 42 are preferably endless which eliminates the need for field splicing.

Flanking rows of laterally opposed resiliently compressible side guide wheels 62 (e.g., commercially available "Omega" brand), capable of conforming to geometric irregularities in carrier side surfaces and then recovering to its original shape while keeping the carrier laterally centered on belts 36, 38.

Quiet running belts 40, 42 instead of noisier chains or spaced carrier-engaging driving wheels or rolls.

Each transfer assembly of conveyor 32 is individually and conjointly reversible, allowing the system to be readily stripped of carriers for maintenance.

Modular construction of each transfer assembly 34 for fast and simple installation, economy of construction, standardization of parts and reduction in service part inventory.

Figure 10:
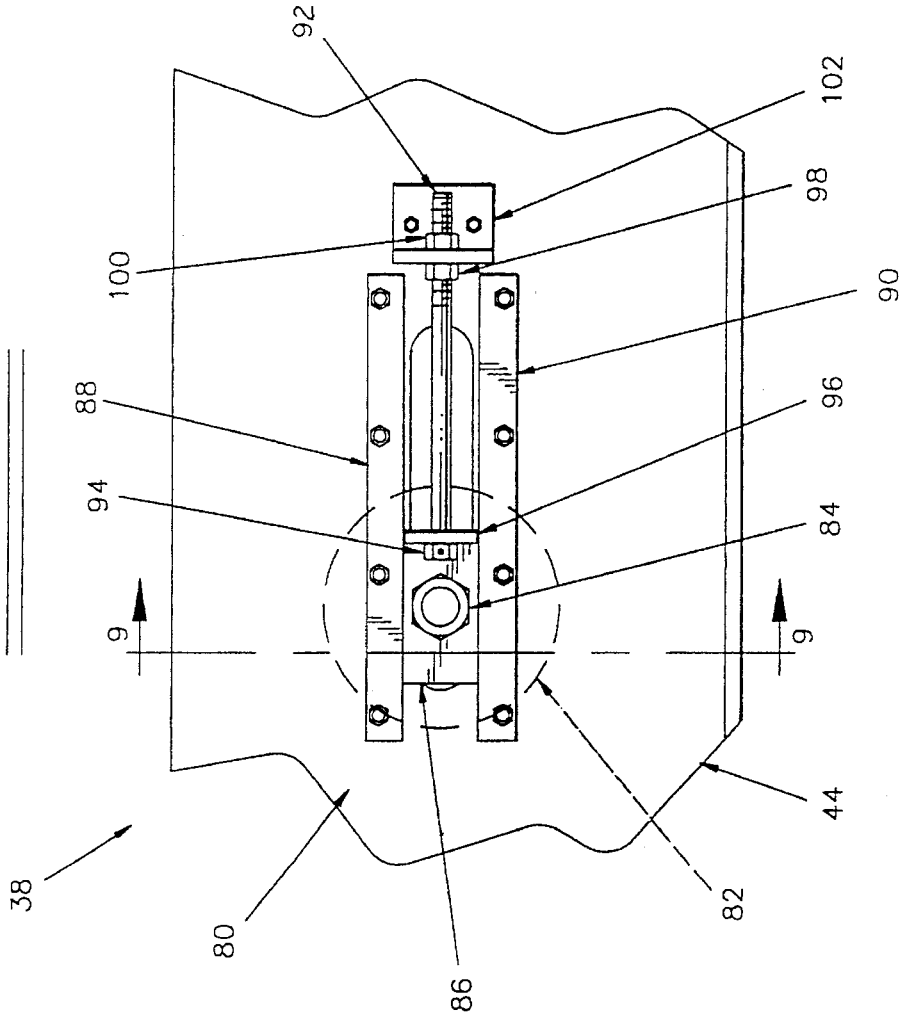
FIG. 10 is an enlarged fragmentary elevational view looking in the direction of the bracket arrow 10 of FIG. 4 at the take-up.
Figure 9:
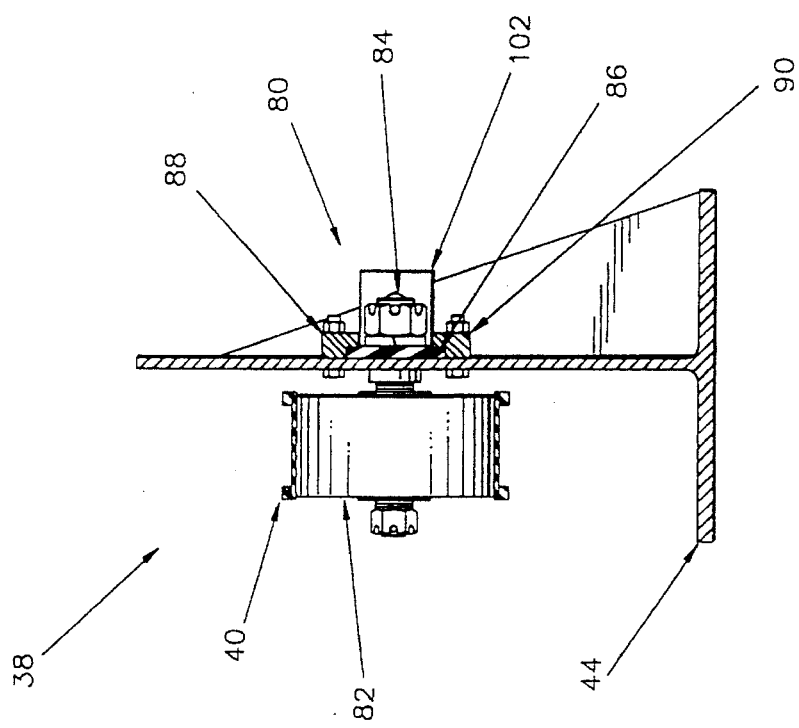
FIG. 9 is an enlarged vertical section view taken on line 9—9 of FIGS. 6 and 10 at the belt take-up idler adjustment mechanism of the left module.

Minimal maintenance (belts require less attention than chains and/or in-line driven support rolls);

Sliding belt take-up with jack screw mechanism 80 on each module with enough travel to accommodate belt installation, pre-tensioning and elongation over time (normal wear). As shown in FIGS. 6, 9 and 10, each take-up mechanism 80 includes a movably supported belt-take-up idler wheel 82 rotatably carried by (and adjustable axially of) a threaded axle 84 in turn supported on a slider block 86 which is take-up adjustable along a pair of support tracks 88 and 90 by a take-up screw 92. Screw 92 is fixed at one end by a nut 94 to a bracket 96 of block 86, and adjustably fixed by nuts 98 and 100 to a bracket 102 fixed to T-frame member.

Figure 14:
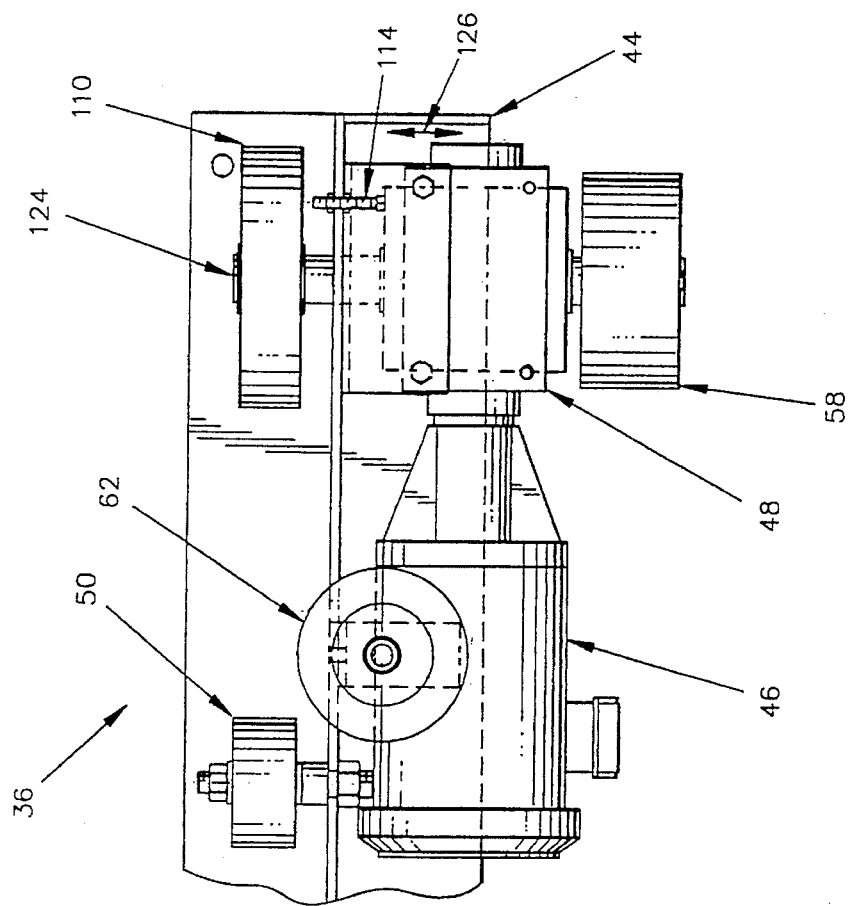
FIG. 14 is an enlarged plan view at the drive of the right hand module.
Figure 13:
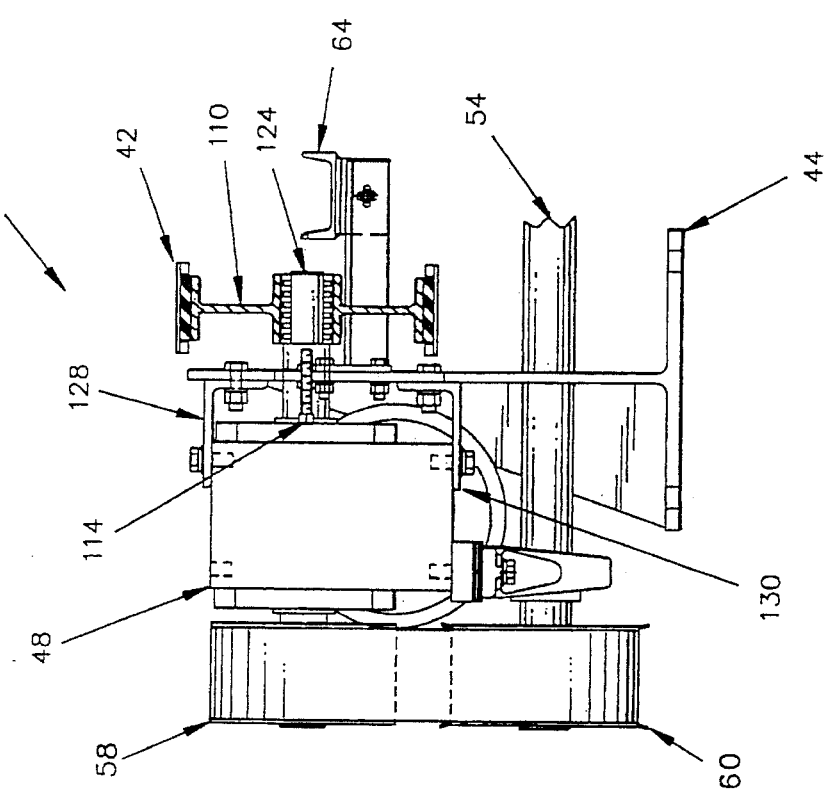
FIG. 13 is a further enlarged, part sectional view at the drive of the right hand module as viewed on line 5—5 of FIG. 4.

As shown in FIGS. 11–14, head and tail belt pulley 110 and 112 respectively (FIGS. 4 and 6) are individually adjustable axially of the direction of belt travel for optimizing belt tracking, by means of associated jack screws 114 and 116 respectively. As best shown in FIGS. 11 and 12, the idler axle 118 of tail pulley 112 can be moved bodily as adjusted by screw 116 in the direction of adjustment arrow 120 by its mounting on an adjustable support framework 122 fixed on T-frame member 44. Likewise, as best shown in FIGS. 13 and 14, the common drive axle 124 of belt head pulley 110 and cross-drive pulley 58 can be moved bodily as adjusted by screw 114 in the direction of adjustment arrow 126 by its mounting in associated reducer 48 in turn adjustably carried on support angles 128 and 130 fixed on T-frame member 44.

When the several sections 34 are incorporated as a system in conjunction with a towing conveyor 24, the towing conveyor is ramped slightly as at 28 and 30 (FIGS. 2 and 3) at the entrance to the first and exit from the last sections 34 of transfer conveyor 32. These ramps provide means of a swivel wheeled carrier disengaging truck C from main conveyor 24 by ramp-lifting of the truck C off of support by its own wheels 66 to support on the belts of the high-speed transfer conveyor 32, and then lowering the truck back into driven re-engagement with main conveyor 24. These entrance and exit areas of conveyor 32 are also provided with controls to protect against over-filling prior to the work station or after the work station.

The AC or DC variable speed cross-drive paired drive motors 46 of each transfer assembly 34 provide an adjustable means of controlling belt (and hence carrier) speed, acceleration and deceleration on each transfer assembly section, and controller-synchronized carrier transport and transfer cooperation between all transfer assemblies 34 of transfer conveyor 32. This allows for maximum staged and synchronized acceleration or deceleration of each carrier C without slipping occurring between the carrier support drive belts 40, 42 and the carrier truck frame C. This feature is used on all entrance and exit transfer assembly units 34 which interface with slower moving main conveyors. It also permits fine positioning at the work station S.

Inasmuch as the product (e.g., auto body B) may not be located precisely on the associated carrier C, and the carriers themselves may not be precise, locating of the product may ordinarily be only approximate. Stopping is accomplished by first braking by controllably slowing motors 46 gradually to a low speed and then braking quickly by controllable stopping motors 46 to bring carrier C a set stop point. The level of accuracy is sufficient for use with robots that have a vision or part locator system.

Another principal feature of transfer assembly 34 (cooperable with the controllable variable speed motor drive feature) is the provision of endless belts 40, 42 supported by a series of idler wheels or rollers 50 spaced apart along the carrier transport travel path on each side of the unit. Wheels 50 are thus spaced apart regularly along and beneath the associated upper belt run at a distance (related to the product length) that will assure adequate carrier support and smooth operation, and with the belt upper runs extending planar for the full length of the associated transfer assembly. Wheels 50 are mounted individually on cantilevered spindles 51 mounted perpendicular to T-frame 44 (FIG. 7).

Belts 40, 42 can be constructed of different suitable materials; however, the invention contemplates preferably the use of polyvinyl chloride or polyurethane inner belt material, the friction surface of which is composed of a coated polyester or polyamide fabric. Belts 40, 42 must provide a high resistance to damage yet be resilient enough to drive effectively and quietly. Each belt 40, 42 may be supported solely by soft treaded idler wheels 50 or solely by a slider bed or beds 52, but preferably by or a combination of the two as best seen in FIG. 6.

The inverted T-frame construction of frame members 44 provides for a compact arrangement which minimizes the amount of floor space required at each side of the conveyor. Spindles 51 mounted to the T-frame provide the bearing support for each idler wheel 50.

Wheels 50 can be located at different spacings depending on carrier design. In addition, slider beds 52 may be located one between each adjacent pair of wheels 50. Spacing of side guide rollers 62 laterally of assembly 34 from an opposed roller 62, as well as lengthwise along the assembly, is variable as well, either by custom design or by suitable adjustable mounting.

The T-frame construction of members 44 minimizes guarding requirements by placing most moving components on the inboard side of each module 36, 38. Only the jack shaft pulleys 58 and 60 (and associated drive belt 56) and side guide wheels 62 need to be enclosed. On some units the continuous channel guides 64 are required to prevent the truck casters 66 from contacting the support wheels 62 and to maintain their orientation generally aligned with main conveyor travel. However, guides 64 do not affect the design or operation of the unit.

Each transfer assembly section 34 of the transfer conveyor 32 ordinarily has two controls or sensors 70 and 72 actuated by the carrier C during transport on the transfer assembly. The first is located several feet from the other and sufficiently far from the end so that the carrier can be stopped approximately in the center of each section 34. The first control activates the deceleration cycle, the second determines position for accurate stopping. Where precise positioning is required, an auxiliary locator would be activated after the stop cycle is completed.

A transfer system conveyor 32 consists of any number of transfer units 34 depending on the number of work stations S and the amount of accumulation desired before and after each work station. A typical system would have seven stations (sections 34) as follows:

1;—Receiving (detach)

2;3;—Wait (before unit—2)

4;—Work

5;6;—Wait (after work—2)

7;—Return (attach)

Each station 34 having a load C will automatically advance the load to the next station if the next station is empty or if that station is also in position to advance its load. On need to advance, the stations with a load and the one(s) to receive a load will speed up, advance the load, slow down, and stop.

For example, on a seven station unit conveyor 32 the usual condition is to have a load in the work station S and in the two wait stations after the work station. The two wait stations ahead of the work station are generally empty, the one before the work station receives a load just prior to the time the work station is cleared. The receive and return stations have loads in various stages of approaching or leaving.

As long as the work station S is operating properly (is completing all work prior to the time for a shift of the stationary carrier) and as soon as the return station is clear, the two wait stations after the work station, the work station, and the wait station ahead will all advance as a group. This action brings a new load into the work station and refills the return section.

Loads approaching the receiving station pass a detector. If the receiving station is available, the main conveyor 20 (typically chain-on-edge) is permitted to continue running. If the station is not clear, the main conveyor will stop until it is clear.

The carrier C entering the receiving station is engaged with the main conveyor until it is safely into the receiving station. At this point, the transfer conveyor 32 is synchronized with the main conveyor 24. The carrier C is raised slightly by ramping the main conveyor up. The amount of lift is just enough to elevate the underside of the carrier above belts 40, 42. As soon as the front of the carrier is over the belts of the receiving station the main conveyor slopes downwardly and away, leaving the carrier resting on and straddling belts 40, 42 of the receiving station of transfer conveyor 32. The carrier is frictionally pulled safely onto this first section by the transfer conveyor belts 40, 42. The carrier caster wheels 66 are then suspended above guides 64 and hence are free of their carrier loading and can rotate or remain stationarily idle as the load carrier is then moved off of the main conveyor. The carrier is now free to be advanced at high speed on transfer conveyor 32.

The action at the return station 34 of conveyor 32 is the reverse of the above. Near the exit end of this return station the main conveyor 20 is raised until it is as the proper carrier towing level. The return station of transfer conveyor 32 synchronizes in carrier transport speed with the main conveyor 20 and remains so synchronized until the return station is no longer in contact with the carrier. The main conveyor elevation is maintained until the carrier is clear of the last return transfer section where it can be sloped down to its original level or any other level.

A position sensor 70 or 72 would be used to indicate that the return transfer section is clear so that the next carrier can be advanced. An additional sensor 70, 72 would be used to signal the main conveyor to shut down if the carrier is not in the proper position to be picked up by the main conveyor. The main conveyor will remain stopped until the carrier arrives.

Figure 15:
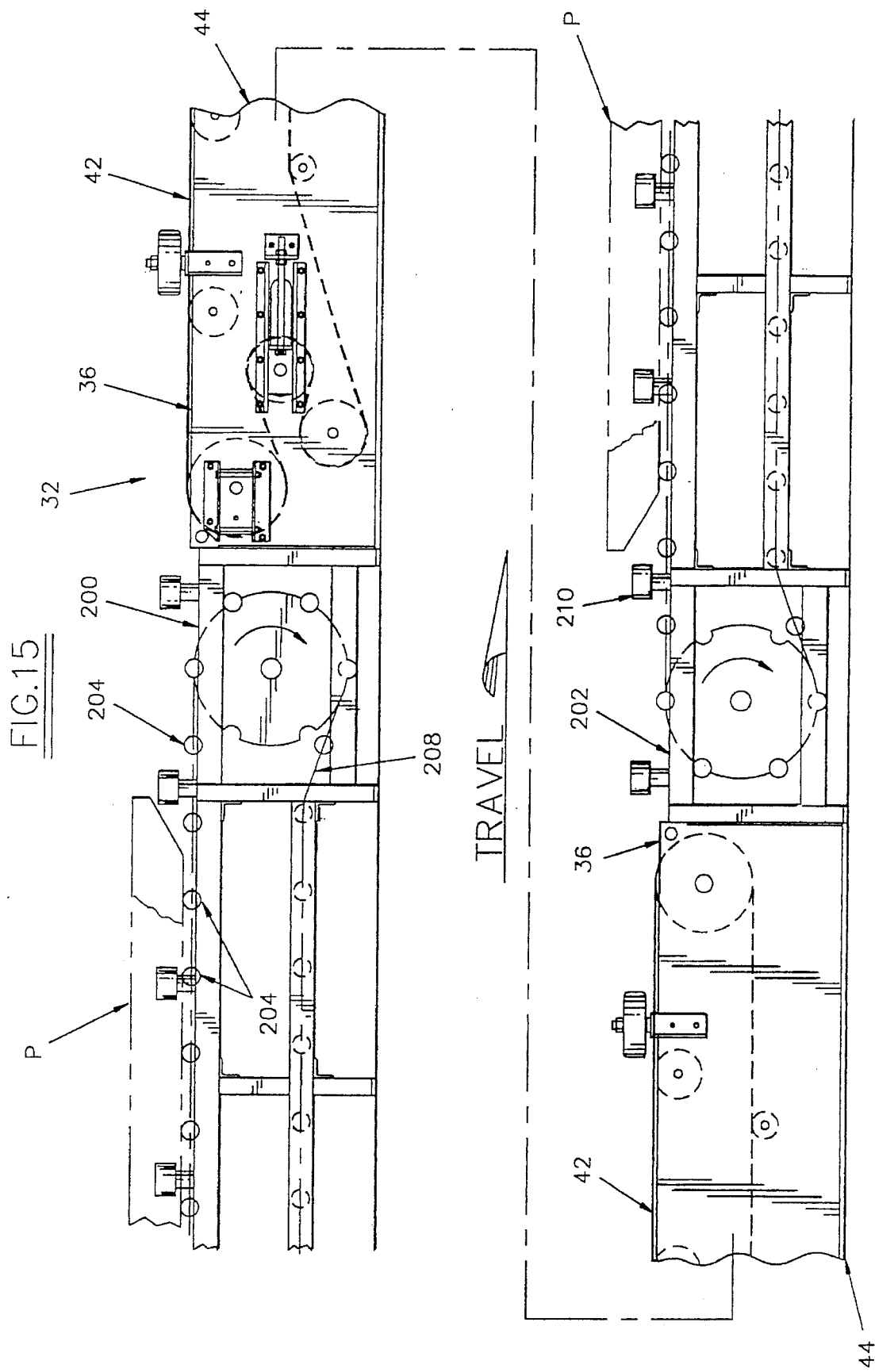
FIG. 15 is a fragmentary side elevational split view of another typical form of carrier conveyor system combined with the entrance and exit of a transfer assembly system of FIGS. 1–14.

A modified form of the carrier conveyor system is shown in FIGS. 15–17 wherein the carriers comprise skids or other wheeless pallets p, and the main conveyors 200 and 202 include rollers 204 of associated conveyor chains 208 for supporting and moving the skids (FIG. 17). As shown in FIG. 15, a first carrier conveyor 200 brings the skids p to the receiving section 34 of transfer conveyor 32, at the elevation of belts 40, 42, and a second main conveyor 202 receives the skids p from the exit station 34 of transfer conveyor 32, also at the elevation of belts 40, 42. The transfer conveyor 32 comprises a plurality of transfer assemblies 34 as in the prior form of the invention. The conveyors 200 and 202 are of conventional construction and include the paired endless chains 208 each with rollers 204 that engage each skid, and side-engaging rollers 210 that guide the skid.

From the foregoing description, it will now be apparent that the present invention amply fulfills both the objects of the aforementioned '100 patent as well as the additional objects set forth above unique to the present invention, as well as incorporating many novel features providing a substantially improved carrier conveyor system over that disclosed in the '100 patent. In addition to the advantages set forth hereinabove, the carrier conveyor system of the invention enables a plurality of transfer assemblies 34 to be arrayed in cooperative tandem fashion to provide all of the advantages of a belt-type conveyor versus a live-roller or live-wheel conveyor but additionally with belt conveyance of carriers subdivided and shared seriatum by the in-line tandem transfer assemblies 34. Hence the travel of each carrier C on transfer conveyor 32 can be varied in speed relative to that of carriers on the associated main conveyors as well as other carriers on the transfer conveyor 32. Since each transfer assembly 34 has its own main and back-up drive for each and both of its conveyor belts 40, 42, the belt speed of each assembly 34 may be controllably varied to produce forward or reverse motion of each carrier at speeds ranging from between zero to, for example, 360 feet per minute.

By providing suitable carrier sensors appropriately positioned along the carrier path of travel on conveyor 32 the acceleration or deceleration inertial loads of workpiece laden carriers can be shared as between the various sections or stations 34 of conveyor 32. Also the relative carrier transport speeds of successive transfer assemblies 34 can be automatically synchronized to provide smooth hand off of a carrier from one section to another even during carrier acceleration and deceleration as well as during constant velocity travel of the carriers on conveyor 32. Because of this successive load sharing the size and power ratings of the respective drive motors 46 of each transfer assembly 34 may be correspondingly reduced while still maintaining fast overall transport capability even for multiple row of heavily work-loaden carriers; that is, the range of acceleration and/or deceleration required of each transfer assembly section 34 can be reduced because the plurality of assemblies 34 share the work of accelerating and decelerating the carriers. The broad, smooth and stable carrier transport support provided by the laterally spaced belts 40, 42, together with their large area frictional gripping of the under surface of each carrier, helps stabilize carrier transport both on individual transfer assembly 34 as well as during the hand off operation between tandem transfer assemblies 34.

The preferred arrangement of alternating belt upper run support idler wheels 50 and slider beds 52 as illustrated in FIG. 6 helps maximize belt/carrier frictional driving interface area while minimizing belt/support drag and provides a smoother ride and drive for each carrier, and at lower cost in construction and maintenance, than live or idler roll or wheel direct-support type conveyors. This alternating belt-support arrangement also imposes less drag forces on the upper belt runs than that composed entirely of slider beds or bed. However for lighter load applications belt upper run supports composed entirely of slider beds may be preferred because lower manufacturing, maintenance and service costs.

The invention is thus shown and described by way of illustration, not by way of limitation, and may be subject to various modifications without departing from the spirit thereof or the scope of the appended claims.

What is claimed is:

1. A carrier conveyor system comprising a main conveyor, a plurality of carriers positioned in closely spaced relation on said main conveyor, said main conveyor having means in closely spaced relation for engaging and moving said carriers along a travel path, a work station at which a carrier is to be stoped to perform a work function, said main conveyor having a first portion in advance of the work station and a second portion beyond the work station, means defining a first track associated with the first portion of the main conveyor along which the carriers are movable along the travel path, means defining a second track associated with the second portion of the main conveyor along which the carriers are movable along the travel path, means associated with the first track and first portion of the conveyor for successively disengaging the carriers from the first portion at the end of the first portion and disengaging the carriers relative to the first track, means associated with the second track and the second portion for successively re-engaging the carriers with the second portion and the second track, and a transfer conveyor between the end of said first track and said second track for transferring the carriers along the travel path to the work station, removing the carriers from the work station and returning the carriers along the travel path to the second track, said transfer conveyor comprising a plurality transfer assemblies in a closely spaced tandem array, each of said transfer assemblies comprising a pair of carrier transport modules arranged one on each side of the travel path of the carriers from the first track through the work station to the second track, at least a first one of said transfer assemblies being provided at a first station between the first track and the work station, a second one of said transfer assemblies being provided at the work station, and at least a third one of said transfer assembly being provided at a third station between the work station and the second track, each of said transfer assembly modules comprising an endless flexible belt trained longitudinally of said assembly module and having an upper run operable to move parallel to the travel path of the carriers and adapted to engage the underside of a carrier adjacent an associated one of the longitudinal sides of the carrier, said modules being constructed and arranged as mirror-images of one another with said belts running parallel and facing one another therebetween and with the space between said belts of one of said modules on one side of the travel path of a carrier and said belts of said other module of said assembly on the other side of said path of a carrier being substantially unobstructed, motor means individual to each said transfer assembly module for individually driving each of said belts thereof, each motor means for driving said belts of each said transfer assembly being operable independently of said motor means of the other of said assemblies and of the main conveyor to accelerate a carrier on the associated transfer assembly to a speed higher than the speed of the main conveyor, and thereafter to decelerate the carrier and to cause braking of the carrier on each transfer assembly, each of said motor means of said modules of each transfer assembly being operably mechanically coupled in direct driving and driven relationship with the other of said motor means within each said transfer assembly, said first track being positioned such that the first portion of the conveyor delivers a carrier to said belts of said first transfer assembly adjacent to the first track so that the motor means of said first transfer assembly can be operated to accelerate the carrier and rapidly move the carrier onto said first transfer assembly, said second track being positioned such that said belts of said third transfer assembly adjacent the second track deliver a carrier to the second track, the number of said plurality of said transfer assemblies of said transfer conveyor being such that a carrier will be returned to the main conveyor so that there are no vacant spaces between the closely spaced carriers on the main conveyor while providing the necessary work and safety time at the work station.

2. The conveyor system set forth in claim 1 including means for starting and stopping the drive of each said belts in each said transfer assembly independently of the drive of the other of said transfer assemblies, and means for controlling the operation of said drive means such that said belts of one of said transfer assemblies will not be driven if a carrier is present in a next succeeding one of said transfer assemblies.

3. The conveyor system set forth in claim 1 wherein each said motor is a variable speed alternating or direct current motor operably controlled for causing all movement and stoppage of the associated belts in direct relation to the output speed of said motor.

4. The conveyor system set forth in claim 3 wherein each said transfer assembly module includes a plurality of longitudinally spaced belt supports for supporting an upper run of said belt thereof for planar travel along the carrier path of travel on said module.

5. The conveyor system set forth in claim 4 wherein each said transfer assembly includes yieldable side guide rollers mounted on said modules thereof in laterally spaced rows along the carrier travel path on said assembly and cooperable for side engagement with a passing carrier for laterally centering the same during travel on said assembly.

6. The conveyor system set forth in claim 1 wherein each said transfer assembly module comprises a longitudinally extending base member, a variable speed AC or DC motor mounted on said base member, a drive belt and associated pulley mounted on said base member and drivingly interconnected to said motor, and a plurality of belt support wheels mounted on said base member around which said carrier transport belt is trained for movement thereon in a continuous loop, one of said wheels being connected to said drive belt for driving said transport belt.

7. The conveyor system set forth in claim 6 wherein belt slider bed means is provided on each said module interspersed with said belt support wheels and cooperable therewith for supporting the upper run of said belt.

8. The conveyor system set forth in claim 1 wherein said carriers comprise wheeled trucks, said first and second tracks extending along the floor and engaged by said wheels, said means for disengaging said trucks from said first conveyor portion comprising a first upwardly inclined track portion, said means for re-engaging said trucks with said second track portion comprising a second downwardly inclined track portion, said main conveyor first and second portions comprising parts of a single main conveyor, said main conveyor being guided along said first and second inclined portions but being depressed between said transfer assemblies of said transfer conveyor substantially along the floor in the area between said first and second track portions and through the work station.

9. The conveyor system as set forth in claim 8 including means for guiding the wheels of said trucks as they are moved through said transfer conveyor to prevent the truck wheels from moving or turning laterally into the oath of adjacent structure of said modules.

10. The conveyor system set forth in claim 2 wherein said control means comprises a sensor at the first track portion, a sensor at the second track portion, and sensors associated with said transfer assembly.

11. The conveyor system set forth in claim 1 wherein first and second sensors are provided at each said transfer assembly, and means associated with said first sensor for controlling the deceleration of the carrier, and means associated with said second sensor for controlling the stopping of the carrier.

12. The conveyor system set forth in claim 1 wherein said main conveyor comprises a chain conveyor, said carriers comprise skids supported by and moved by said chain conveyor, said first portion of said main conveyor being associated with said transfer conveyor such as to deliver a carrier to the one of said transfer assemblies nearest said main conveyor first portion, said second portion of said main conveyor being associated with said transfer conveyor such as to receive a carrier from one of said transfer assemblies nearest to said main conveyor second portion.

13. For use in a carrier conveyor system comprising a main conveyor, a plurality of carriers positioned in closely spaced relation on said main conveyor, said main conveyor having means in closely spaced relation for engaging and moving said carriers along a travel path, a work station at which a carrier is to be stopped to perform a work function, said main conveyor having a first portion in advance of the work station and a second portion beyond the work station, the improvement comprising means defining a first track associated with the first portion of the main conveyor along which the carriers are movable along the travel path, means defining a second track associated with the second portion of the main conveyor along which the carriers are movable, means associated with the first track and first portion for successively disengaging the carriers from the first portion at the end of the first portion and disengaging the carriers relative to the first track, means associated with the second portion and the second track for successive re-engaging the carriers with the second portion and second track, and a transfer conveyor between the end of said first track and said second track for transferring the carriers along the travel path to the work station, removing the carriers from the work station and returning the carriers along the travel path to the second track, said transfer conveyor comprising a plurality of transfer assemblies in a closely spaced tandem array along the travel path, each of said transfer assemblies comprising a pair of carrier transport modules arranged one on each side of the travel path of the carriers through the work station, at least a first one of said transfer assemblies being provided at a first station between the first track and the work station, a second one of said transfer assemblies being provided at the work station, and at least a third one of said transfer assemblies being provided at a third station between the work station and the second track, each of said transfer assembly modules comprising an endless flexible belt trained longitudinally of said assembly module and having an upper run operable to move parallel to the travel path of the carriers and adapted to engage the underside of a carrier adjacent an associated one of the longitudinal sides of the carrier, said modules being constructed and arranged as mirror-images of one another with said belts running parallel and facing one another therebetween and with the space between said belts of one of said modules on one side of the travel path of a carrier and said belts of said other module of said assembly on the other side of said path of a carrier being substantially unobstructed, motor means individual to each said transfer assembly module for individually driving each of said belts thereof, each motor means for driving said belts of each said transfer assembly being operable independently of said motor means of the other of said assemblies and of the main conveyor to accelerate a carrier on the associated transfer assembly to a speed higher than the speed of the main conveyor, and thereafter to decelerate the carrier and to cause braking of the carrier on each transfer assembly, each of said motor means of said modules of each transfer assembly being operably mechanically coupled in direct driving and driven relationship with the other of said motor means within each said transfer assembly, said first track being positioned such that the first portion of the conveyor delivers a carrier to said belts of said first transfer assembly adjacent to the first track so that said motor means of said first transfer assembly can be operated to accelerate the carrier and rapidly move the carrier onto said first transfer assembly, said second track being positioned such that said belts of said third transfer assembly adjacent the second track deliver a carrier to the second track, the number of said plurality of said transfer assemblies of said transfer conveyor being such that a carrier will be returned to the main conveyor so that there are no vacant spaces between the closely spaced carriers on the main conveyor while providing necessary work and safety time at the work station.

14. The transfer conveyor set forth in claim 13 including means for starting and stopping the drive of each set of said belts in each said transfer assembly independently of the drive of the other of said transfer assemblies, and means for controlling the operation of said drive means such that said belts of one transfer assembly will not be driven if a carrier is present in a next succeeding one of said transfer assemblies.

15. The transfer conveyor set forth in claim 13 wherein each said motor is variable speed alternating or direct current motor operably controlled for causing all movement and stoppage of the associated belt in direct relation to the output speed of said motor.

16. The transfer conveyor set forth in claim 15 wherein each said transfer assembly module includes a plurality of longitudinally spaced belt supports for supporting an upper run of said belt thereof for planar travel along the carrier travel path on said module.

17. The transfer conveyor system set forth in claim 16 wherein each said transfer assembly includes resiliently yieldable side guide rollers mounted on said modules thereof in laterally spaced rows along the carrier travel path on said assembly and cooperable for side engagement with a passing carrier for laterally centering the same during travel on said assembly.

18. The transfer conveyor set forth in claim 1 wherein each said transfer assembly module comprises a longitudinally extending base member, a variable speed AC or DC motor mounted on said base member, a drive belt and associated pulley mounted on said base member and drivingly interconnected to said motor, and a plurality of belt support wheels mounted on said base member around which said carrier transport belt is trained for movement in a continuous loop thereon, one of said wheels being connected to said drive belt for driving said transport belt.

19. The conveyor system set forth in claim 18 wherein a transport belt slider bed means is provided on each said module interpersed with certain ones of said belt support wheels and cooperable therewith for supporting an upper run of said transport belt.

20. The conveyor system set forth in claim 13 wherein said carriers comprise wheeled trucks, and including means disposed in the space between said belts for guiding the wheels of said trucks as they are moved through said transfer conveyor to prevent the wheels from moving or turning laterally into the path of the laterally adjacent structures of each of said modules.

21. The carrier conveyor system set forth in claim 1 wherein the number of said plurality of said transfer assemblies comprises at least five, said first one of said five transfer assemblies defining a receiving assembly for receiving a carrier from the first portion and first track of the main conveyor, a fourth one of said five transfer assemblies at a fourth station defining a wait transfer assembly in advance of the work station, a fifth one of said five transfer assemblies at a fifth station defining a wait assembly downstream from the work station, and said third transfer assembly defining a return assembly for delivering a carrier to the second portion and second track of the main conveyor.

22. The transfer conveyor set forth in claim 13 wherein the number of transfer assemblies comprises at least five, said first one of said five transfer assemblies defining a receiving assembly for receiving a carrier from the first portion and first track of the main conveyor, a fourth one of said five transfer assemblies at a fourth station defining a wait assembly in advance of the work station, a fifth one of said transfer assemblies at a fifth station defining a wait assembly downstream from the work station, and said third transfer assembly defining a return assembly for delivering a carrier to the second portion and second track of the main conveyor.

23. A transfer assembly comprising first and second carrier transport modules arranged one on each side of the travel path of a carrier to be transported on said transfer assembly, each of said transfer assembly modules comprising an endless flexible transport belt trained longitudinally of said assembly module and having an upper run operable to move parallel to the travel path of the carrier and adapted to engage the underside of the carrier adjacent an associated one of the longitudinal sides of the carrier, said modules being constructed and arranged as mirror-images of one another facing one another and defining a space between said belts with said belts running parallel, said belt of said first module being disposed on one side of the travel path of the carrier and said belt of said second module being disposed on the other side of said path of the carrier with the space therebetween being substantially unobstructed, and first and second motor means individually operably coupled respectively to said first and second modules for individually driving said belts thereof, said first and second motor means being operable independently of one another and capable of accelerating the carrier on said transfer assembly to a speed higher than the entrance speed of the carrier entering thereon, decelerating the carrier and braking the carrier on said transfer assembly, said first and second motor means being operably mechanically coupled in direct driving and driven relationship with one another within said transfer assembly.

24. The transfer assembly set forth in claim 23 wherein each said motor is a variable speed motor operably controlled for causing all movement and stoppage of the associated belts in direct relation to the output speed of said motor.

25. The transfer assembly set forth in claim 23 wherein each said transfer assembly module includes a plurality of longitudinally spaced belt supports for supporting an upper run of said belt thereof for planar travel along the carrier path of travel on said module.

26. The transfer assembly set forth in claim 23 including yieldable side guide rollers mounted on said modules thereof in laterally spaced rows along the carrier travel path on said assembly and cooperable for side engagement with a passing carrier for laterally centering the same during travel on said assembly.

27. The transfer assembly set forth in claim 23 wherein each said module comprises a longitudinally extending base member, the associated one of said variable speed motors being mounted on said base member, the associated one of said belts and an associated pulley being mounted on said base member and drivingly interconnected to said associated motor, and a plurality of belt support wheels mounted on said base member around which said associated belt is trained for movement thereon in a continuous loop, one of said wheels being connected to said belt for driving said belt.

28. The transfer assembly set forth in claim 27 wherein belt slider bed means is provided on each said module interspersed with said belt support wheels and cooperable therewith for supporting the upper run of said belt on said module.

29. The transfer assembly as set forth in claim 27 wherein the carrier comprises a wheeled truck with swivel caster wheels, and said transfer assembly includes means for guiding the wheels of said truck as they are moved through said transfer assembly to prevent the truck wheels from swiveling laterally into the path of adjacent structure of said modules.

\* \* \* \* \*